(12) United States Patent
Mishra (10) Patent No.: US 11,440,277 B2
(45) Date of Patent: Sep. 13, 2022

(54) METHOD OF REPAIRING COMPOSITE SANDWICH PANELS

(71) Applicant: Bell Textron Inc., Fort Worth, TX (US)

(72) Inventor: Suvankar Mishra, Carrollton, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 16/846,373

(22) Filed: Apr. 12, 2020

(65) Prior Publication Data

US 2021/0316519 A1    Oct. 14, 2021

(51) Int. Cl.
| | | |
|---|---|---|
| *B29C 73/10* | (2006.01) | |
| *B29C 73/24* | (2006.01) | |
| *B64F 5/40* | (2017.01) | |
| *B29K 105/06* | (2006.01) | |
| *B29L 31/30* | (2006.01) | |

(52) U.S. Cl.
CPC .............. *B29C 73/10* (2013.01); *B29C 73/24* (2013.01); *B64F 5/40* (2017.01); *B29K 2105/06* (2013.01); *B29L 2031/3076* (2013.01)

(58) Field of Classification Search
None
See application file for complete search history.

(56) References Cited

U.S. PATENT DOCUMENTS

| | | | | |
|---|---|---|---|---|
| 8,642,158 B2* | 2/2014 | Bogue | ..................... | B29C 73/10 428/116 |
| 2016/0101878 A1* | 4/2016 | Wardlaw | ............. | B29C 44/1285 416/229 R |
| 2018/0312278 A1* | 11/2018 | Baca | ....................... | B29C 73/06 |

\* cited by examiner

*Primary Examiner* — Barbara J Musser
(74) *Attorney, Agent, or Firm* — Lightfoot & Alford PLLC (57) ABSTRACT

A method of repairing an aircraft component having a structural core surrounded by an exterior skin of composite material includes removing damaged material from the component to create a cavity therein that exposes an undamaged portion of the structural core, applying a septum comprising composite material to the undamaged portion of the structural core within the cavity such that an orientation of fibers in the septum matches an orientation of fibers in the exterior skin, placing a repair core onto the septum in the cavity such that cells of the repair core are in alignment with cells of the undamaged portion of the structural core, inserting a shim into the cavity along a perimeter of the repair core, applying a patch that covers the cavity to the exterior skin, and co-curing the septum, shim, and patch to bond the repair core in place within the cavity.

14 Claims, 6 Drawing Sheets

METHOD OF REPAIRING COMPOSITE SANDWICH PANELS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

In a known process for repairing a composite sandwich panel of an aircraft, damaged core material is removed from the panel, creating a void therein. An uncured shelf is adhesively joined to existing core material in the void and is co-cured with the adhesive. Replacement core material is then placed in the void and cells of the replacement core are filled with expandable foam. Once the foam expands and cures, excess is trimmed. A skin patch is applied over the repaired area and the repair assembly is cured. A disadvantage of this known process is that materials introduced during the repair, such as the expandable foam, add weight to the repaired component that was not present prior to the repair. Another disadvantage is that the time required for the multiple discrete curing processes can undesirably lengthen downtime of the affected aircraft.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Systems and methods for repairing composite sandwich panels, for example panels that comprise components of aircraft such as rotorcraft, are disclosed herein. It is desirable to repair such panels so that the restoration of structural integrity in the panels is maximized, and simultaneously to add as little resulting weight as possible to the panels.

Figure 1:
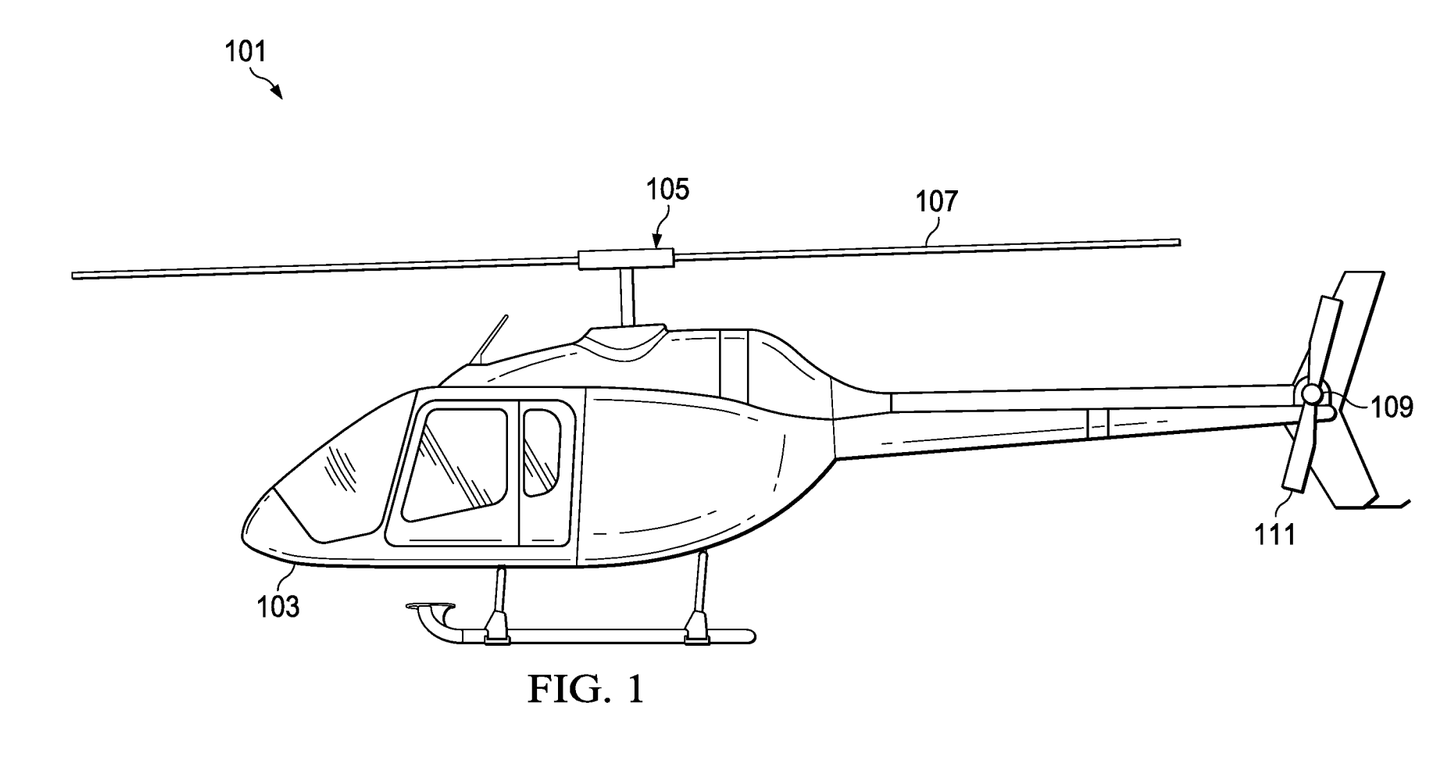
FIG. 1 is side view of a rotorcraft.

FIG. 1 is a side view of a rotorcraft 101. Rotorcraft 101 comprises a fuselage 103, a main rotor 105 that includes a plurality of main rotor blades 107, and a tail rotor 109 that includes a plurality of tail rotor blades 111. The pitch of blades 107 can be selectively adjusted to control direction, thrust, and lift of rotorcraft 101. The pitch of blades 111 can be selectively adjusted to control thrust that is produced by rotor 109 to counter torque effects created by rotor 105.

One or more components of rotorcraft 101, such as blades 107, blades 111, or all or portions of fuselage 103 can be manufactured from composite sandwich panels. Preferably, such a panel comprises a core having a plurality of cells arranged in an array, the cells made of Polyetherimide (PEI) thermoplastic. The core is sandwiched between respective portions of exterior skin that comprise one or more layers of composite material. In this disclosure, composite material preferably refers to plies of a fiber-reinforced polymer (FRP) composition that includes filament fibers, such as carbon or glass fibers for example, embedded in a thermoset polymer matrix material such as a thermoplastic resin. Preferably the fibers within the plies are woven and the plies are pre-impregnated with resin.

Figure 2:
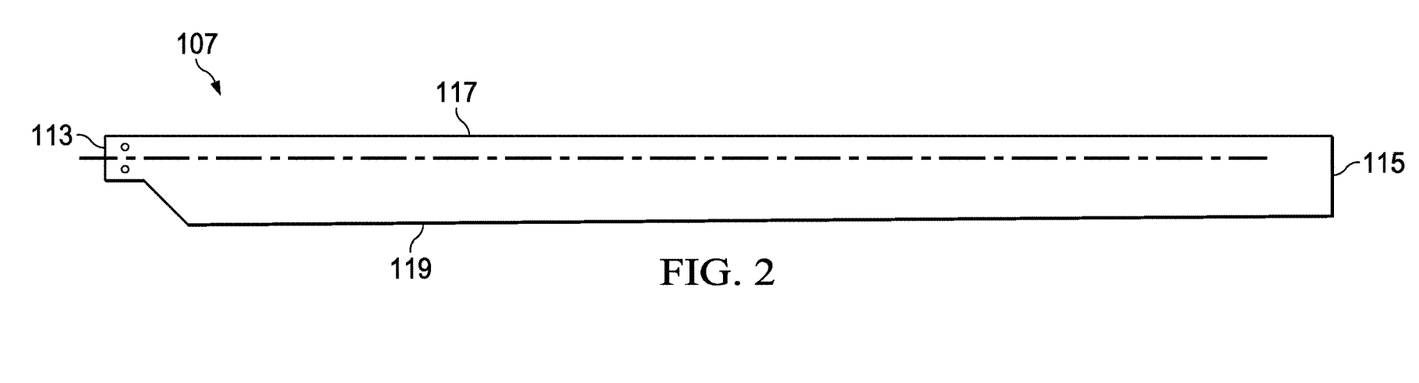
FIG. 2 is top view of a rotor blade component of the rotorcraft depicted in FIG. 1.
Figure 3:
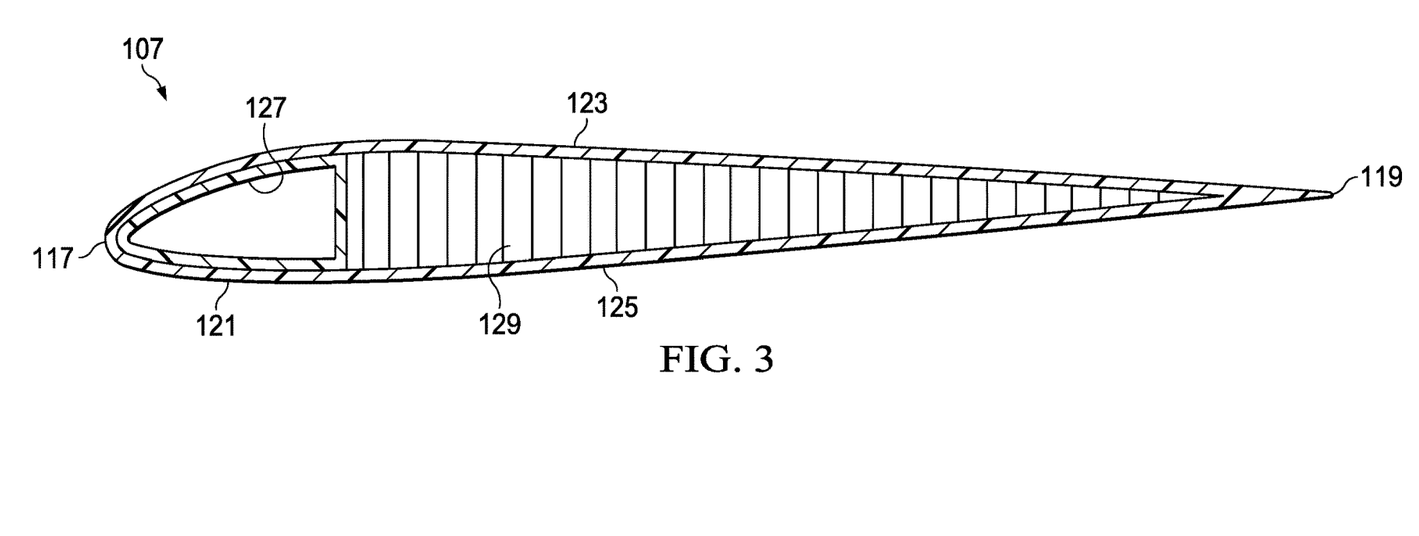
FIG. 3 is a cross-sectional view of the rotor blade depicted in FIG. 2.

FIGS. 2 and 3 are a top view and a cross-sectional view, respectively, of a single blade 107. As shown, blade 107 has a root end 113 and a tip end 115 that is spaced from the root end 113. Blade 107 includes a leading-edge portion 117 and a trailing-edge portion 119. Blade 107 includes an aerodynamic exterior skin 121. As shown, skin 121 comprises an upper portion 123 and a lower portion 125. Blade 107 has internal structural components including a spar 127 and a material core 129 that are sandwiched between upper and lower portions 123, 125, respectively, of skin 121. Preferably, core 129 comprises an array of PEI thermoplastic cells and skin 121 comprises layered plies of carbon-fiber-reinforced polymer (CFRP).

One or more components of rotorcraft 101 comprising composite sandwich panels may become damaged. For example, such components of rotorcraft 101 may be damaged during flight, may be damaged by ground personnel while the aircraft is on the ground, and so on. Repair of damaged composite sandwich panel components may be necessary to ensure continued safety of rotorcraft 101 during operation. It should be appreciated damage may be incurred to one or both of the exterior skin and structural core of a composite sandwich panel. In a scenario where damage is limited to the exterior skin, the underlying core may still be damaged during removal of the skin, thus necessitating repair of both the core and the exterior skin.

Figure 4:
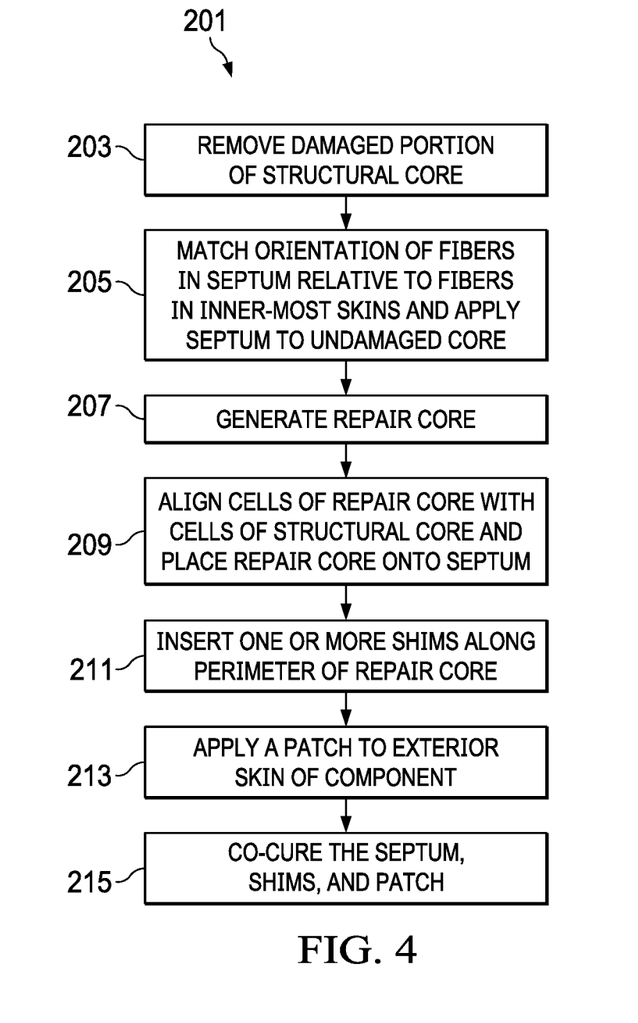
FIG. 4 is a flow chart illustrating a method for repairing a composite sandwich panel, such as the rotor blade depicted in FIGS. 2 and 3, according to this disclosure.

FIG. 4 is a flowchart illustrating a method 201 of repairing a composite sandwich panel, such as blade 107 of rotorcraft 101, in accordance with this disclosure. In this regard, method 201 comprises a method of repairing an aircraft component having a structural core surrounded by an exterior skin of composite material. Method 201 is described herein with reference to FIGS. 5A-5D, which are cross-sectional views illustrating a repair of a damaged portion of blade 107.

Figure 5A:
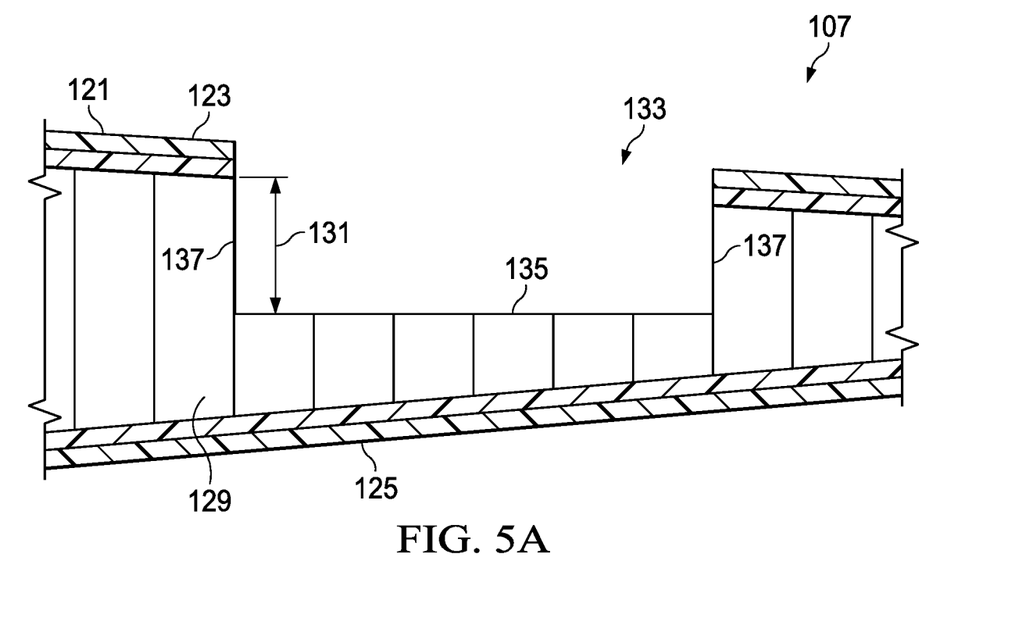
FIGS. 5A-5D are cross-sectional views of a rotor blade at various stages during performance of an embodiment of the method depicted in FIG. 4, according to this disclosure.

At step 203 of method 201, one or more damaged portions of core 129 are removed. As shown in FIG. 5A, core 129 is removed to a depth 131 that corresponds to a depth to which the damage extends into core 129 relative to upper portion 123 of skin 121. A portion of core 129 that includes the damaged portion is removed, forming a cavity 133 in blade 107. Core 129 can be reformed by removing damaged portions thereof, for example via machining, to create a surface of undamaged core 129. In this embodiment, cavity 133 is formed having a bottom surface 135 that is planar, or at least substantially planar, and perimeter side walls 137. Cavity 133 is preferably formed to expose an undamaged portion of core 129. For example, cavity 133 is preferably formed such that all or substantially all of core 129 that remains between surface 135 and lower portion 125 of skin 121 is undamaged. Step 203 preferably further includes removing or trimming one or more sections of upper portion 123 of skin 121, such that an opening in skin 121 shares a perimeter with that of cavity 133. Step 203 can optionally include cleaning and removing any contaminants in and around cavity 133, for example using techniques known in the art.

Figure 5B:
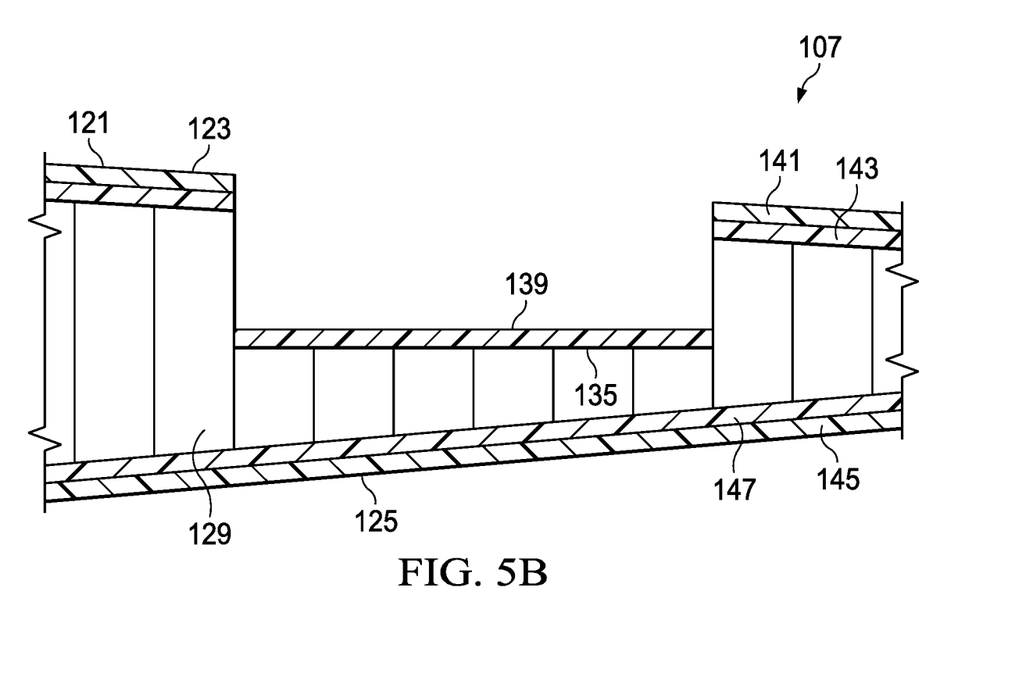

At step 205, a septum 139 is applied to the undamaged core 129 in cavity 133 (e.g., as shown in FIG. 5B). More specifically, septum 139 is applied to bottom surface 135 of cavity 133. Septum 139 is preferably applied directly to bottom surface 135, for example with no other materials, adhesives, etc. therebetween. Septum 139 is fabricated from material that is the same as that of skin 121. Preferably, both skin 121 and septum 139 are made of FRP material. In this embodiment, septum 139 comprises an uncured single ply of FRP. Skin 121 has a plurality of layers, each layer comprising a ply of FRP material. In an actual implementation of blade 107, skin 121 may have more than two layers; and upper portion 123 may have the same or different number of layers as lower portion 125. But for the sake of simplicity in this disclosure, skin 121 is illustrated as having two layers. As shown, upper portion 123 includes an outermost layer 141 and an innermost layer 143 and lower portion 125 includes an outermost layer 145 and an innermost layer 147.

Septum 139 is applied to the undamaged core 129 within cavity 133 such that the orientation of fibers in septum 139 matches an orientation of fibers in skin 121. Preferably, septum 139 is applied to surface 135 such that the orientation of fibers in septum 139 matches that of one or both of innermost layer 143 and innermost layer 147 of skin 121. Matching the orientation of fibers in septum 139 with the orientation of fibers in the innermost layer of skin 121 can improve the performance of septum 139 as a sheer transfer medium once the repair is completed and blade 107 is again subjected to loading, for example during flight of rotorcraft 101.

At step 207, a repair core 149 that is adapted for installation into cavity 133 is generated. In this embodiment, repair core 149 is fabricated from an undamaged portion of core material and is made from the same material as core 129. Preferably, both core 129 and repair core 149 are made of PEI thermoplastic and have respective pluralities of cells arranged in matching arrays. Having matching arrays may mean, for example, that core 129 is manufactured with its cells arranged in a first pattern and that the material from which repair core 149 is generated is manufactured with its cells arranged in a second pattern that matches the first pattern.

Figure 5C:
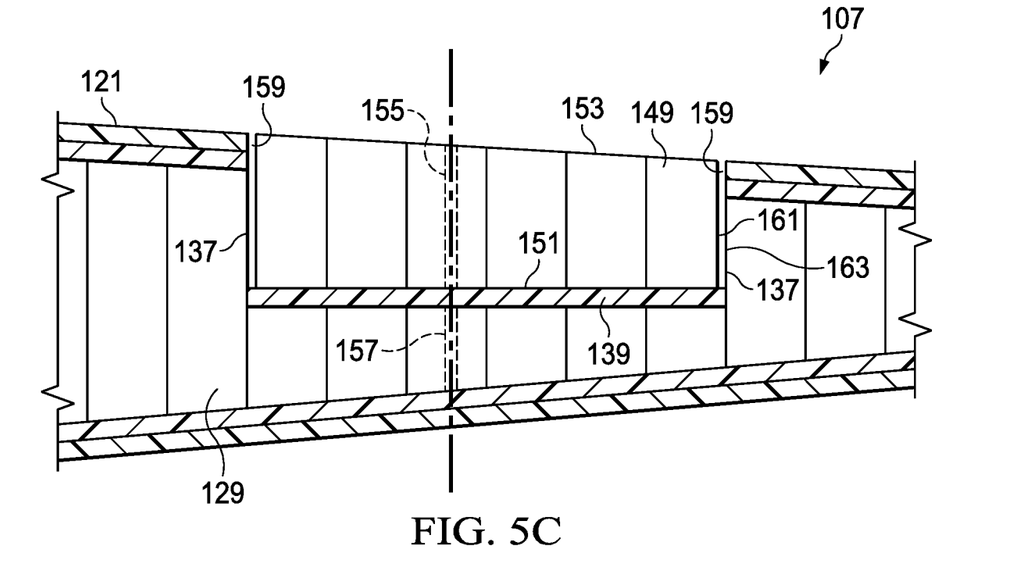

In an example fabrication process, repair core 149 is machined from a portion of core material stock. Repair core 149 is preferably sized to create an interference fit within cavity 133 when installed therein. As shown, repair core 149 has a planar bottom surface 151 adapted to be placed onto septum 139 and an upper surface 153 that substantially matches the contour of skin 121 when repair core 149 is installed in cavity 133 (e.g., as shown in FIG. 5C).

At step 209, repair core 149 is installed into cavity 133 and placed onto septum 139 such that cells of repair core 149 are in alignment with corresponding cells of core 129. For example, repair core 149 is installed into cavity 133 such that a cell 155 of repair core 149 is coaxially aligned with a cell 157 of core 129. The coaxial alignment of cell 155 with cell 157 is illustrative of the preferred alignment of all cells in repair core 149 with corresponding cells in core 129 when repair core 149 is placed onto septum 139. Aligning cells of repair core 149 with those of core 129 may be achieved using a backlit nondestructive inspection (NDI) technique, for example. Coaxial alignment of cells of repair core 149 with cells of core 129 can improve sheer transfer between repair core 149 and core 129 once the repair is completed and blade 107 is again subjected to loading, for example during flight of rotorcraft 101.

With repair core 149 installed in cavity 133, one or more voids 159 may remain between repair core 149 and core 129, for example at respective locations along a perimeter of repair core 149 where a volume of space exists between an outer surface 161 of repair core 149 and an inner surface 163 defined by a side wall 137 of cavity 133.

Figure 5D:
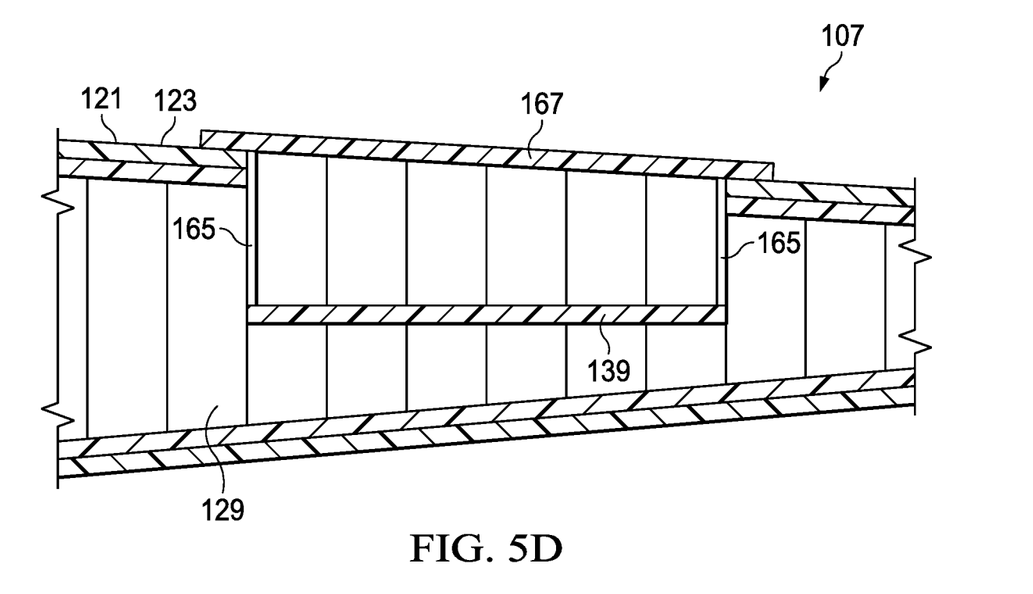

At step 211, one or more shims 165 are inserted along the perimeter of repair core 149 (e.g., as shown in FIG. 5D). Inserting a shim 165 comprises positioning the shim 165 at a location where a void 159 exists and pressing the shim 165 into place within the void 159. Inserting one or more shims 165 along the perimeter of repair core 149 can improve how tightly repair core 149 fits in cavity 133 and can enhance bonding of repair core 149 within cavity 133, as described elsewhere herein. Additionally, shear path continuity between repair core 149 and core 129 can be improved by substantially or completely filling the volume of cavity 133, for example with one or more shims 165 in addition to repair core 149. Shims 165 are preferably made of the same FRP material as septum 139 and skin 121. Preferably, shim 165 comprises a piece of uncured FRP that is rolled into a solid cylindrical shape and has a length that corresponds to a depth of a void 159 into which it will be inserted. However, it should be appreciated that shim 165 is not limited to a solid cylindrical shape and that shim 165 may alternatively be configured in any other suitable geometry.

At step 213, a skin patch 167 that covers cavity 133 and an area around cavity 133 is applied to skin 121. Preferably, patch 167 is oversized relative to the perimeter of cavity 133 and when applied, directly contacts upper surface 153 of repair core 149 and overlaps directly onto upper portion 123 of skin 121 around the perimeter of cavity 133 (e.g., as shown in FIG. 5D). Patch 167 comprises one or more layers of uncured composite material, and preferably is made from the same FRP material as skin 121 and septum 139. For the sake of simplicity in this disclosure, patch 167 is illustrated as having a single layer. It should be appreciated that patch 167 is not limited to being made from uncured FRP material. For example, patch 167 may alternatively be made from a rigid material, such as a portion of precured composite material or metal, and may be adhesively bonded to repair core 149 and skin 121.

At step 215, the assembled repair, including septum 139, repair core 149, shims 165, and patch 167 is subjected to a co-curing process. The co-curing process is performed by controlling one or more of temperature, vacuum, and pressure. During the co-curing process, the thermoplastic resin in septum 139, shims 165, and patch 167 cures and repair core 149 fuses in place within cavity 133 via co-bonding with the FRP components. More specifically, core 129 and repair core 149 co-bond with septum 139, shims 165, and patch 167 during the co-curing process, and patch 167 bonds to skin 121. Co-curing all components of the repair at once saves time compared to known sandwich panel repair methods that require multiple discrete curing and bonding cycles before a repair is completed.

It should be appreciated that performance of method 201 is not strictly limited to the framework of steps as illustrated and described herein. For example, the steps of method 201 need not be performed in the enumerated order, and one or more steps of method 201 may be modified or omitted altogether as appropriate. To illustrate, step 207 may be omitted, for example in a scenario where one or more prefabricated repair cores 149 are provided. In such a scenario, step 203 may be modified such that cavity 133 is formed based on the volume of a prefabricated repair core 149 that is selected for installation therein.

Figure 6A:
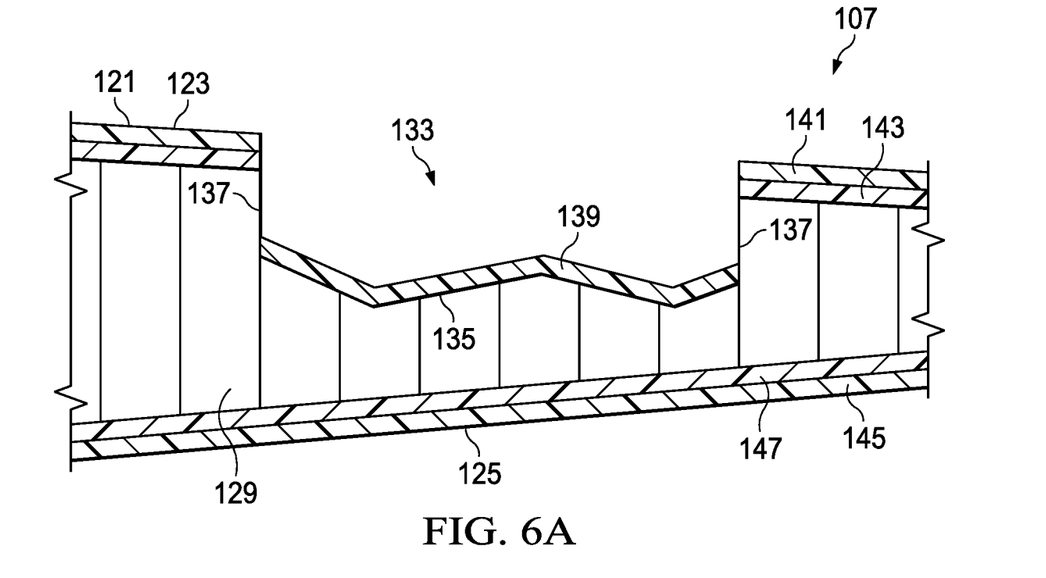
FIGS. 6A-6B are cross-sectional views of a rotor blade at various stages during performance of an alternative embodiment of the method depicted in FIG. 4, according to this disclosure.

To further illustrate, in accordance with an alternative embodiment of method 201 one or more steps are modified. For example, at step 203 removal of damaged portions of core 129 is substantially localized. More specifically, preservation of undamaged core 129 is maximized while removing damaged portions of core 129. This alternative removal technique may result in cavity 133 having a bottom surface 135 that is non-planar. Such a non-planar bottom surface 135 may have one or more breaks or discontinuities, for example as shown in FIG. 6A, or may have a continuous contour with one or more peaks or valleys (not shown). At step 205, septum 139 is applied to the undamaged core 129 within cavity 133 such that the orientation of fibers in septum 139 at least partially matches the orientation of fibers in skin 121, such as one or both of innermost layer 143 and innermost layer 147 of skin 121. Because septum 139 is uncured FRP and therefore flexible, septum 139 conforms to the contour of non-planar bottom surface 135 when applied thereto.

Figure 6B:
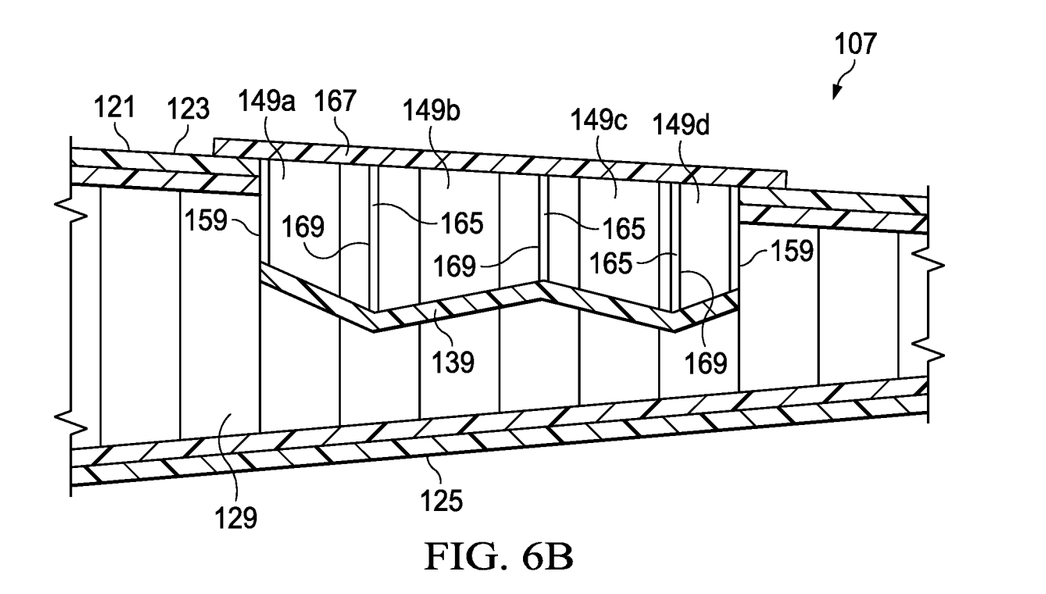

At step 207, repair core 149 comprises a plurality of sections. Each section of repair core 149 has a geometry that substantially conforms to a corresponding portion of bottom surface 135 of cavity 133. As shown in FIG. 6B, repair core 149 comprises four sections 149a, 149b, 149c, and 149d. Sections 149a, 149b, 149c, and 149d may be generated, for example, based upon 3D imaging performed on the damaged portion of blade 107 or other suitable measurement techniques. Alternatively, cavity 133 can be formed based on the volumes and geometries of prefabricated repair cores 149 that are selected for installation therein. It should be appreciated that repair core 149 may alternatively have more or fewer sections. To illustrate, repair core 149 may comprise a single section of core material that is fabricated to conform to the geometry of cavity 133, for example via thermal forming.

At step 209, sections 149a, 149b, 149c, and 149d are installed into cavity 133 and placed onto septum 139 such that cells of sections 149a, 149b, 149c, and 149d are in alignment with corresponding cells of core 129. At step 211, one or more shims 165 are inserted along the respective perimeters of sections 149a, 149b, 149c, and 149d. For example, as shown in FIG. 6B shims 165 are inserted into voids 159 between one or more of sections 149a, 149b, 149c, and 149d and core 129, and into voids 169 between perimeter surfaces of sections 149a, 149b, 149c, and 149d that are adjacent to one another in cavity 133. At step 213 a skin patch 167 that covers cavity 133 and an area around cavity 133 is applied to skin 121. At step 215, the assembled repair, including septum 139, sections 149a, 149b, 149c, and 149d, shims 165, and patch 167 is co-cured under vacuum.

For illustrative purposes, performance of method 201 is illustrated and described herein applying to repairing blade 107 of rotorcraft 101. However, it should be appreciated that method 201 may be performed to repair composite sandwich panels of other components of rotorcraft 101, and more generally any composite sandwich panel for which use of method 201 is suitable. Furthermore, method 201 can be performed on composite sandwich panels made of other types of materials, such as panels having structural core material made of Nomex®, paper, fiberglass, Kevlar®, plastic, metal, foam, to name a few examples. It should further be appreciated that the respective cells of core 129 and repair core 149 can have any suitable shape, such as round, hexagonal, elliptical, square, to name a few examples. It should further still be appreciated that septum 139 is not limited to a single ply of FRP, and that septum 139 may alternatively comprise a plurality of plies. Moreover, septum 139 may alternatively be made of a different FRP material than that of skin 121.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A method of repairing an aircraft component having a structural core surrounded by an exterior skin of composite material, the method comprising:
   removing damaged material from the component, creating a cavity therein that exposes an undamaged portion of the structural core;

applying a septum comprising composite material to the undamaged portion of the structural core within the cavity such that an orientation of fibers in the septum matches an orientation of fibers in the exterior skin;

placing a repair core onto the septum in the cavity such that cells of the repair core are in alignment with cells of the undamaged portion of the structural core;

inserting a shim into the cavity along a perimeter of the repair core, wherein the shim comprises a fiber-reinforced polymer (FRP) material rolled into an elongate shape comprising a substantially solid cross-section comprising the FRP material with none of the repair core disposed within the cross-section;

applying a patch that covers the cavity to the exterior skin; and co-curing the septum, shim, and patch to bond the repair core in place within the cavity;

wherein the shim is maintained in a rolled state after applying the patch and during the co-curing.

2. The method of claim 1, wherein removing the damaged material comprises forming a planar surface along a bottom of the cavity.

3. The method of claim 1, wherein the septum comprises a ply of fiber-reinforced polymer (FRP) material.

4. The method of claim 3, wherein the exterior skin comprises a plurality of layers of FRP material and wherein the septum is applied such that the orientation of fibers in the septum matches that of fibers in an innermost layer of the plurality of layers.

5. The method of claim 4, wherein the septum and the exterior skin are made of the same FRP material.

6. The method of claim 5, wherein the shim is made of the same FRP material as the septum and the exterior skin.

7. The method of claim 1, wherein the shim comprises a cylinder of composite material.

8. The method of claim 1, wherein inserting the shim comprises positioning the shim between a perimeter surface of the repair core and an inner surface of the cavity.

9. The method of claim 1, wherein the cells of the structural core are made of Polyetherimide (PEI) thermoplastic material.

10. The method of claim 9, wherein the cells of the repair core are made of the same PEI thermoplastic as the structural core.

11. The method of claim 10, wherein the cells of the structural core are arranged in a first pattern and the cells of the repair core are arranged in a second pattern that matches the first pattern.

12. The method of claim 11, wherein alignment of cells of the repair core with cells of the structural core comprises coaxial alignment of the cells.

13. The method of claim 1, wherein the repair core comprises a plurality of sections, each section having a geometry that conforms to a corresponding portion of a bottom surface of the cavity.

14. The method of claim 13, further comprising:
inserting a second shim between respective perimeter surfaces of first and second repair core sections of the plurality that are adjacent to one another in the cavity.

* * * * *